(No Model.)
J. DICK.
CONVEYER CHAIN.
No. 526,072.  Patented Sept. 18, 1894.
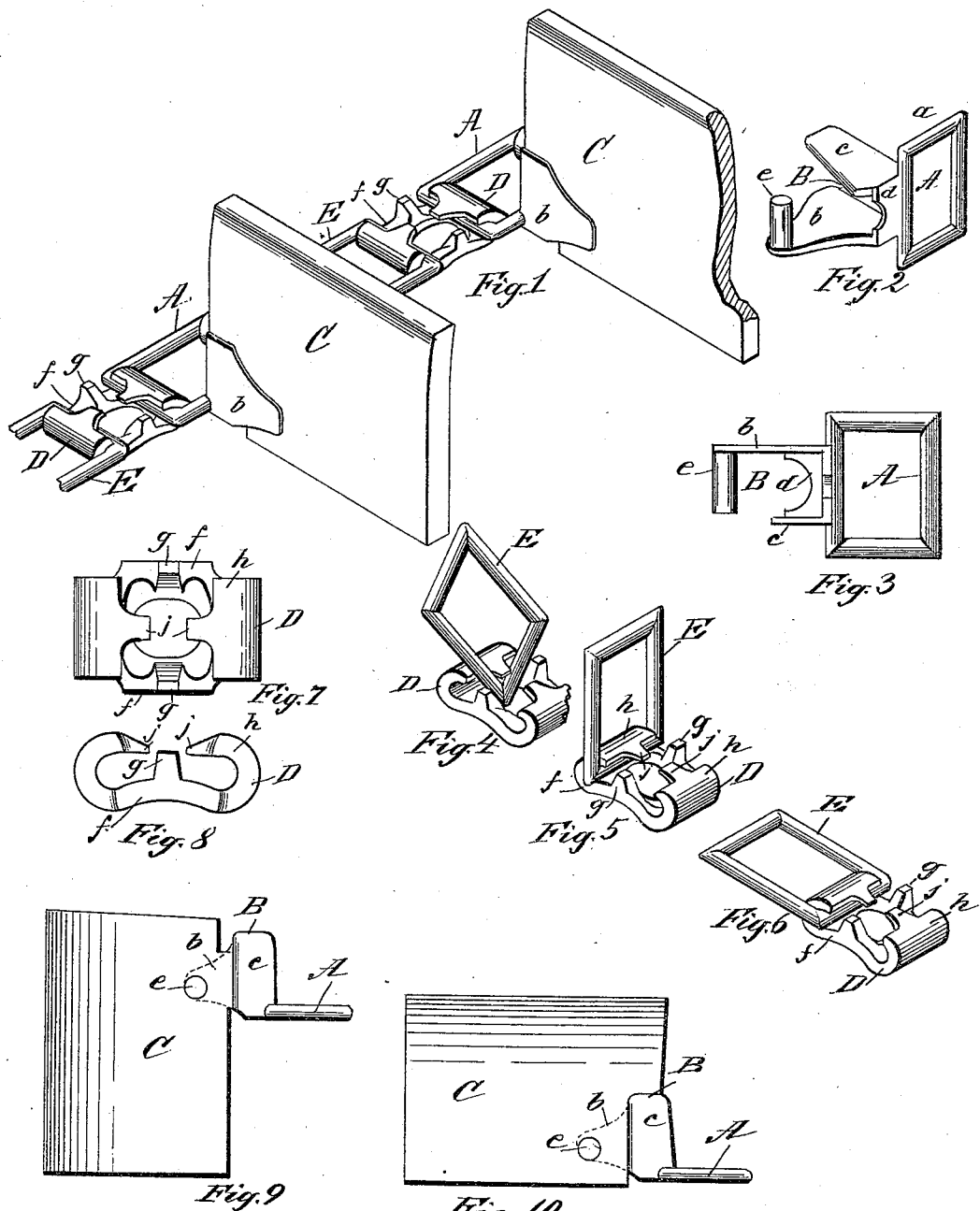
WITNESSES
INVENTOR
Joseph Dick
By W. K. Miller
Attorney

UNITED STATES PATENT OFFICE.

JOSEPH DICK, OF CANTON, OHIO.

CONVEYER-CHAIN.

SPECIFICATION forming part of Letters Patent No. 526,072, dated September 18, 1894.

Application filed January 22, 1894. Serial No. 497,592. (No model.)

*To all whom it may concern:*

Be it known that I, JOSEPH DICK, a citizen of the United States, and a resident of Canton, county of Stark, State of Ohio, have invented a new and useful Improvement in Conveyer-Chains, of which the following is a full, clear, and exact description, reference being had to the accompanying drawings, making part of this specification.

My invention relates to improvements in carriers or conveyers for fodder cutters, and consists in providing links of peculiar form and cross slats adapted thereto, whereby an endless conveyer is formed, having cross slats, forming receptacles or divisions to receive the cut fodder to be removed from the cutting machine, to a place of deposit and for similar uses.

Figure 1, is a view in perspective of a fragment of the conveyer, illustrating my invention. Fig. 2, is a similar view of a link, having a side socket and pin, by which the cross slats are supported and held in working position. Fig. 3, is a plan view of the link shown in Fig. 2. Fig. 4, is a view in perspective showing the manner of passing a link into the coupler. Fig. 5, is a similar view showing the link turned to a position at right angles to the coupler. Fig. 6, is a similar view of link and coupler in normal position. Fig. 7, is a plan view of the coupler. Fig. 8, is a side view. Fig. 9, is a front elevation of link and socket, and the end portion of slat, showing the manner of placing the slat in the socket. Fig. 10, is a similar view showing the slat turned into working position.

Referring to Fig. 2, of the accompanying drawings, A represents a link of rectangle form. However if preferred, the end portion $a$ of the link may be arched to provide for a divergence of the chain from a direct line of draft. At the side of the link is provided a socket B, formed of the wings $b$, $c$, and bottom portion $d$, the wing $b$, having connected therewith a pin or stud $e$, projected transverse the socket formed by the wings $b$ and $c$, which serves as a support for the end portions of the slats C, as shown in Fig. 1.

Referring to Fig. 1, and other figures of the drawings, D represents what I have preferred to call a coupler or coupling link, which is formed substantially as shown, having an apertured central body portion, having side portions $f$, on which is provided upwardly projecting studs $g$, and end portions turned over the body to form hooks $h$ to receive the end portion of the rectangular links. At the central portion of the hook $h$, is provided an inwardly projected tongue $j$, that in connection with the studs $g$ prevents the disengagement of the links A and E from the couplers D.

To form the chain portion of the conveyer, links E are passed into the couplers, as shown in Fig. 4, the corner portion passing into the body, and then turned under the tongue into the position shown in Figs. 5 and 6; the end portion of the link resting in the hook.

If the chain should become slack, the end portion of the links will strike the studs $g$ and be retained in the hook by the tongue $j$.

At desired intervals, links as A having side sockets B, are placed in the chain to receive and support the slats C. To place the slats in the sockets, the chain is turned on edge. The end portion of the slat having a perforation to receive the pin or stud $d$, is passed on the pin as shown in Fig. 9, and when the chain is turned into operative position, the end of the slat will be carried into working position as shown in Fig. 10.

Having thus fully described the nature and the object of my invention, what I claim is—

1. A link for conveying chains having a base $d$ and two wings projecting upwardly from said base and in conjunction with the base forming a slat socket, one of said wings being extended laterally a distance beyond the rear edge of the other wing and provided with a stud or pin, substantially as herein described.

2. A chain coupler consisting of parallel sides having lugs $g$, hooks $h$ connecting the sides and provided with tongues $j$, substantially as herein described.

3. The combination of a conveyer chain, comprising the links A, E, and coupler D as herein described and the slats C substantially as described and for the purpose set forth.

4. A coupler for conveyer chains, having a central open space, parallel sides as $f$, hooks $h$, having inwardly projected tongues $j$, and the upwardly projected lugs $g$, substantially as described and for the purpose set forth.

In testimony whereof I have hereunto set my hand this 11th day of January, A. D. 1894.

JOSEPH DICK.

Witnesses:
W. K. MILLER,
BURT A. MILLER.